United States Patent
Wildman

(10) Patent No.: US 7,776,302 B1
(45) Date of Patent: Aug. 17, 2010

(54) FLUORINE EXTRACTION SYSTEMS AND ASSOCIATED PROCESSES

(75) Inventor: Carrie Wildman, Idaho Falls, ID (US)

(73) Assignee: International Isotopes Inc, Idaho Falls, ID (US)

( * ) Notice: Subject to any disclaimer, the term of this patent is extended or adjusted under 35 U.S.C. 154(b) by 0 days.

(21) Appl. No.: 12/463,099

(22) Filed: May 8, 2009

(51) Int. Cl.
*C01G 43/01* (2006.01)
(52) U.S. Cl. .................. 423/260; 423/261; 423/240 R; 423/241; 423/240 S
(58) Field of Classification Search .......... 423/260, 423/261, 240 R, 241, 240 S
See application file for complete search history.

(56) References Cited

U.S. PATENT DOCUMENTS

| 5,346,684 | A | | 9/1994 | Mestepey |
| 5,757,087 | A | * | 5/1998 | Carter et al. ............ 423/253 |
| 5,888,468 | A | | 3/1999 | Nachtrab et al. |
| 5,901,338 | A | | 5/1999 | Nachtrab et al. |
| 5,918,106 | A | | 6/1999 | Bulko et al. |
| 6,033,642 | A | | 3/2000 | Bulko et al. |
| 6,086,836 | A | | 7/2000 | Smyser et al. |
| 6,096,281 | A | | 8/2000 | Bulko et al. |
| 6,153,164 | A | | 11/2000 | Bulko et al. |
| 6,352,677 | B1 | | 3/2002 | Hage et al. |

OTHER PUBLICATIONS

International Search Report and Written Opinion for International Application No. PCT/US09/43332, Applicant: International Isotopes, Inc., mailed on Jul. 27, 2009, 11 pages.

* cited by examiner

*Primary Examiner*—Timothy C Vanoy
*Assistant Examiner*—Michelle Hou
(74) *Attorney, Agent, or Firm*—Perkins Coie LLP

(57) ABSTRACT

Fluorine extraction systems and associated processes are described herein. In one embodiment, a fluorine extraction process can include loading a mixture containing a uranium fluoride ($U_xF_y$, where x and y are integers) and an oxidizing agent into a reaction vessel. The reaction vessel has a closed bottom section and an opening spaced apart from the bottom section. The fluorine extraction process can also include heating the mixture containing uranium fluoride and the oxidizing agent in the reaction vessel, forming at least one uranium dioxide and a non-radioactive gas product from the heated mixture, and controlling a depth of the mixture in the reaction vessel to achieve a desired reaction yield of the non-radioactive gas product.

16 Claims, 2 Drawing Sheets

US 7,776,302 B1

FLUORINE EXTRACTION SYSTEMS AND ASSOCIATED PROCESSES

TECHNICAL FIELD

The present disclosure is directed generally to fluorine extraction systems and associated processes.

BACKGROUND

Fluorine is a chemical element that is most electronegative of all the chemical elements. Because of this characteristic, fluorine has many unique applications. For example, fluorine has been used in plasma etching of semiconductor wafers for producing processors, memory devices, and/or other microelectronic devices. In another example, compounds of fluorine (e.g., fluoropolymers, potassium fluoride, and cryolite) have been used in anti-reflective coatings and dichroic mirrors because of their unusually low refractive index.

Industrial production techniques of fluorine typically include the electrolysis of hydrogen fluoride (HF) in the presence of potassium fluoride (KF). The hydrogen fluoride required for the electrolysis is typically obtained from phosphate-containing minerals with significant amounts of calcium fluorides (e.g., calcium fluorite, $CaF_2$). Upon treatment with sulfuric acid ($H_2SO_4$), the phosphate-containing minerals release hydrogen fluoride as follows:

$$CaF_2 + H_2SO_4 \rightarrow 2HF + CaSO_4$$

This fluorine production process, however, can be energy intensive because electrolysis requires a large amount of energy to operate. Also, such processes can have high operating costs because of the constant requirement for mineral extraction.

Fluorine can also be obtained as a byproduct of the uranium enrichment process. In nature, uranium exists as about 99.284% of $^{238}U$, about 0.711% of $^{235}U$, and about 0.0058% of $^{234}U$. While $^{235}U$ can be used as a fuel for nuclear fission, the other isotopes, $^{238}U$ and $^{234}U$, cannot. Thus, uranium-containing minerals must first be enriched in order to have sufficient concentrations of $^{235}U$ to support nuclear fission. A common byproduct of the uranium enrichment process includes depleted uranium hexafluoride ($^{238}UF_6/^{234}UF_6$), which is a radioactive and hazardous compound typically stored at great expense. Accordingly, it may be desirable to utilize this source of fluorine to efficiently and cost effectively produce fluorine on an industrial scale.

DETAILED DESCRIPTION

Various embodiments of fluorine extraction systems and associated processes are described below. The term "oxidizing agent" generally refers to a compound capable of being reduced by being combined with at least one fluorine atom. In certain embodiments, the oxidizing agent can be in elemental form. For example, the oxidizing agent can include silicon (Si) in elemental form. In other embodiments, the oxidizing agent can be in a combined form. For example, the oxidizing agent can include germanium oxide (GeO), germanium dioxide ($GeO_2$), silicon dioxide ($SiO_2$), arsenic trioxide ($As_2O_3$), titanium oxide (TiO), boron trioxide ($B_2O_3$), and/or other compounds that may combine with at least one fluorine atom. A person skilled in the relevant art will also understand that the disclosure may have additional embodiments, and that the disclosure may be practiced without several of the details of the embodiments described below with reference to FIGS. 1 and 2.

Figure 1:
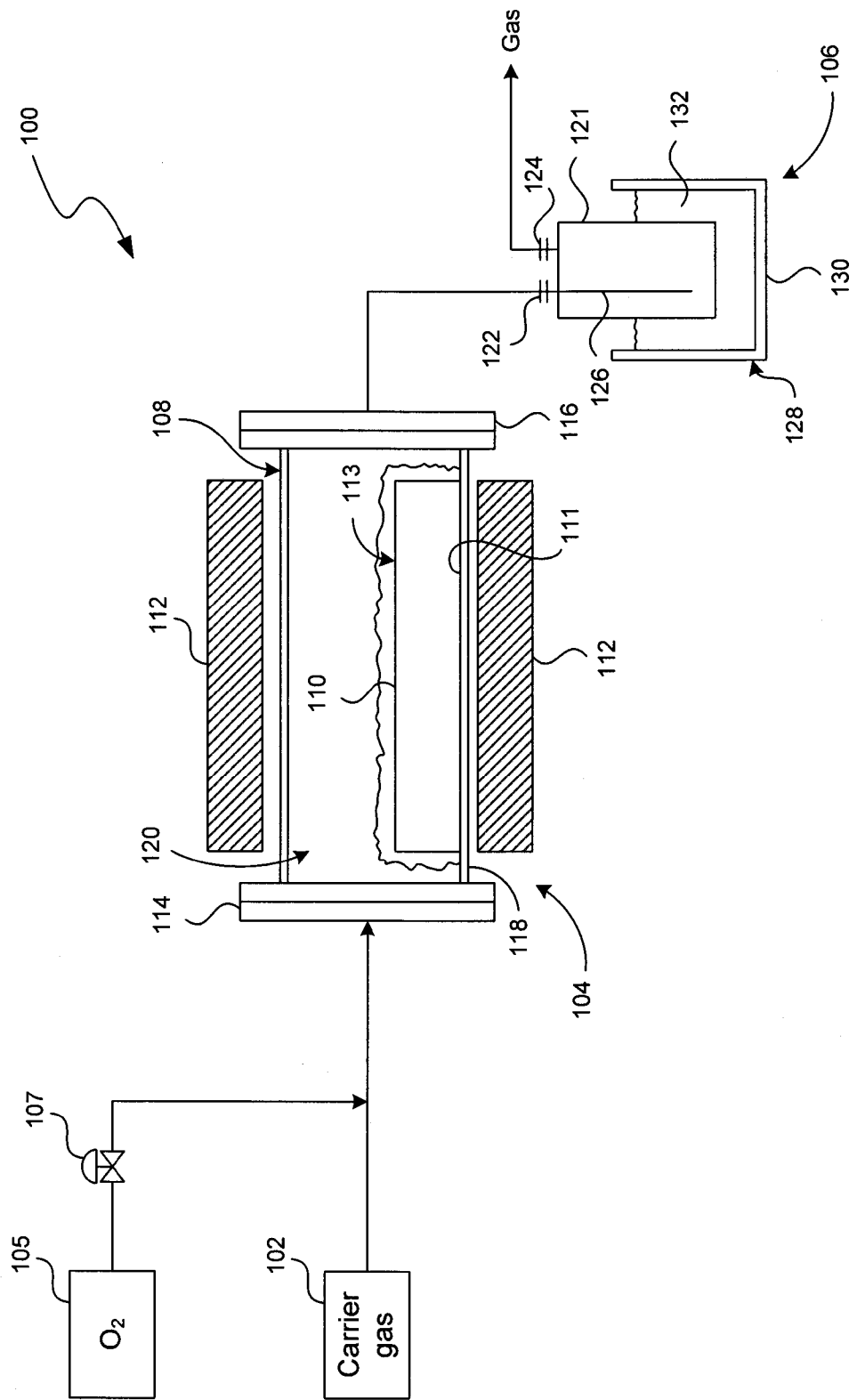
FIG. 1 is a schematic diagram of a fluorine extraction system in accordance with embodiments of the disclosure.

FIG. 1 is a schematic diagram of a fluorine extraction system 100 in accordance with embodiments of the disclosure. As shown in FIG. 1, the fluorine extraction system 100 can include a carrier gas storage 102, a reactor 104, and a product separator 106 coupled to one another in series. Optionally, the fluorine extraction system 100 can also include an oxygen storage 105 coupled to the reactor 104 via a control valve 107. Even though only certain components of the fluorine extraction system 100 are shown in FIG. 1, in other embodiments, the fluorine extraction system 100 can also include valves, actuators, pumps, compressors, and/or other suitable devices.

The reactor 104 can include a reaction chamber 108, a reaction vessel 110 positioned in the reaction chamber 108, and a heater 112 at least proximate to the reaction chamber 108. The reaction chamber 108 can include an inlet 114 spaced apart from an outlet 116 and a reactor body 118 between the inlet 114 and the outlet 116. The reaction chamber 108 can be constructed from a substantially rigid material (e.g., 316L stainless steel) coated on at least one side with nickel, fluoropolymers, and/or other suitable fluorine resistant materials. In the illustrated embodiment, the reactor body 118 is shown as having a generally cylindrical shape extending between the inlet 114 and the outlet 116. In other embodiments, the reactor body 118 can also have other suitable shapes and configurations.

The reaction vessel 110 can be positioned inside the reaction chamber 108 with a head space 120 above the reaction vessel 110. The reaction vessel 110 can include a container configured to hold a reactant or a mixture of reactants in solid and/or liquid form. In certain embodiments, the reaction vessel 110 includes a container having a closed bottom 111 facing an opening 113 to the head space 120, as described in more detail below with reference to FIG. 2. In other embodiments, the reaction vessel 110 can have other suitable configurations. In the illustrated embodiment, the reaction vessel 110 rests directly on the reactor body 118 of the reaction chamber 108. In other embodiments, the reaction vessel 110 can also include poles, plates, and/or other suitable structural components for supporting the reaction vessel 110 inside the reaction chamber 108.

The heater 112 can include an electric furnace, a microwave radiator, and/or other suitable types of heater for supplying thermal energy to the reaction chamber 108. In the illustrated embodiment, the heater 112 is shown as spaced apart from the reaction chamber 108. In other embodiments, the heater 112 may be at least partially enclosing the reaction chamber 108. In further embodiments, the heater 112 may be integrated in the reaction chamber 108.

The product separator 106 can be configured to collect a gaseous product having a desired boiling point or a range of desired boiling points. As shown in FIG. 1, the product separator 106 can include a collector vessel 121 at least partially enclosed by a cooling bath 128. The collector vessel 121 can include a collector inlet 122, a collector outlet 124, and a dip tube 126 coupled to the collector inlet 122. In the illustrated embodiment, the cooling bath 128 includes a chiller bath 130 configured to contain a coolant 132 (e.g., dry ice, water, ice, liquid nitrogen, and/or other coolant with a desired cooling temperature). In other embodiments, the chiller bath 130 may be omitted, and the collector vessel 121 may be air cooled. In further embodiments, the product separator 106 can include a distillation column, an adsorption vessel, and/or other suitable separation components in lieu of or in addition to the components shown in FIG. 1.

Figure 2:
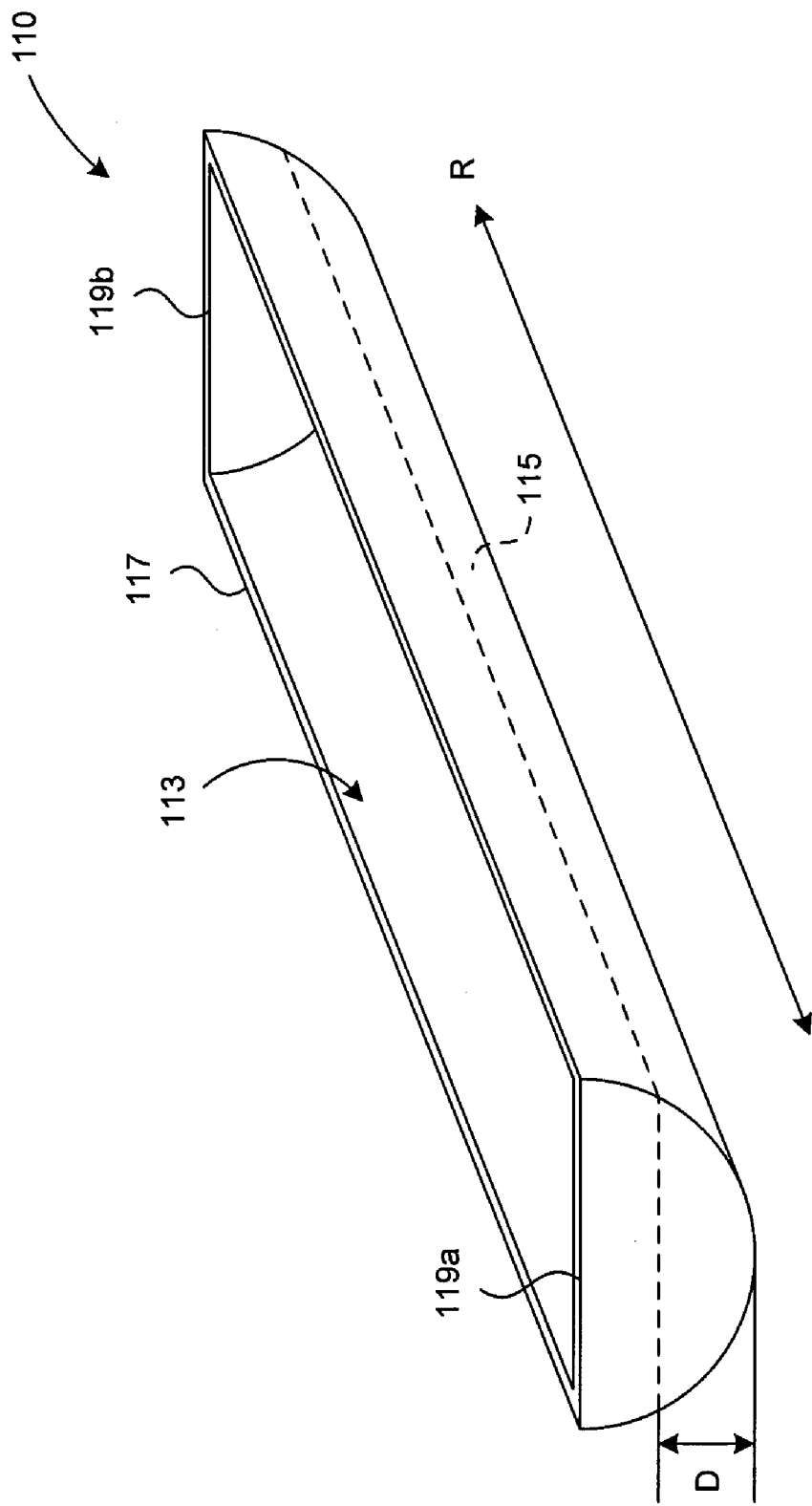
FIG. 2 is a reaction vessel suitable for the fluorine extraction system of FIG. 1 in accordance with embodiments of the disclosure.

FIG. 2 is a reaction vessel 110 suitable for the fluorine extraction system 100 of FIG. 1 in accordance with embodiments of the disclosure. As shown in FIG. 2, the reaction vessel 110 includes a body section 117 welded to, adhered to, fastened to, and/or otherwise coupled to end caps 119 (identified individually as a first end cap 119a and a second end cap 119b). In the illustrated embodiment, the body section 117 includes a portion of a half pipe that has a generally semicircular cross section extending along a longitudinal axis R, and the end caps 119 include semicircular plates. At least the inside of the body section 117 and the end caps 119 can be plated with a nickel film. In other embodiments, the body section 117 can also has a rectangular, oval, trapezoidal, and/or other suitable cross-sectional shapes and arrangements. The body section 117 and/or the end caps 119 can be constructed from stainless steel (e.g., 316L), nickel, and/or other suitable materials.

Referring to FIGS. 1 and 2 together, certain embodiments of the fluorine extraction system 100 can be used to form non-radioactive fluorine-containing compounds by reacting at least one uranium fluoride with an oxidizing agent. In operation, an operator can first load a reactant and/or a mixture of reactants 115 in the reaction vessel 110. In certain embodiments, the mixture of reactants 115 can include at least one uranium fluoride and an oxidizing agent in stoichiametric and/or other suitable proportions. The uranium fluoride can include uranium tetrafluoride ($UF_4$), uranium hexafluoride ($UF_6$), uranium oxyfluoride ($UO_2F_2$), and/or other suitable uranium fluorides. The oxidizing agent can include germanium oxide, (GeO), germanium dioxide ($GeO_2$), silicon (Si), silicon dioxide ($SiO_2$), arsenic oxides (e.g., $As_2O_3$ or $As_2O_5$), antimony oxides (e.g., $Sb_2O_3$, $Sb_2O_4$, and $Sb_2O_5$), titanium oxides (e.g., TiO, $TiO_2$, $Ti_2O_3$, $Ti_3O_5$, and $Ti_4O_7$), boron oxides (e.g., $B_2O_3$, $B_2O$, and $B_6O$), and/or other suitable metal oxides. In other embodiments, the mixture of reactants 115 can also include additional and/or different compounds.

After loading the mixture of reactants 115 in the reaction vessel 110 and adjusting the depth D based on a desired reaction yield, the operator can then position the reaction vessel 110 in the reaction chamber 108. The operator can then evacuate the headspace 120 (e.g., with a vacuum pump) and purge the reaction chamber 108 with a carrier gas (e.g., argon, nitrogen, helium, etc.) from the carrier gas storage 102. After a desired atmosphere is achieved in the reaction chamber 108, the operator can energize the heater 112 to supply energy to the mixture of reactants 115 in the reaction vessel 110 until a desired temperature is achieved.

Without being bound by theory, it is believed that the mixture of reactants 115 of the uranium oxide and the oxidizing agent can react to form at least one uranium oxide and a non-radioactive fluorine-containing compound. For example, in one embodiment, the mixture of reactants 115 containing uranium tetrafluoride ($UF_4$) and germanium dioxide ($GeO_2$) can react as follows:

$$3UF_4 + 3GeO_2 + O_2 \rightarrow U_3O_8 + 3GeF_4$$

In another example, the mixture of reactants 115 containing uranium oxyfluoride ($UO_2F_2$) and germanium dioxide ($GeO_2$) can react as follows:

$$2UO_2F_2 + GeO_2 \rightarrow 2UO_2 + GeF_4$$

In yet another example, the mixture of reactants 115 containing uranium tetrafluoride ($UF_4$) and silicon dioxide ($SiO_2$) as follows:

$$3UF_4 + SiO_2 + O_2 \rightarrow U_3O_8 + 3SiF_4$$

In yet further examples, the mixture of reactants 115 containing the uranium fluoride can react with other suitable oxidizing agents to produce at least one uranium oxide and a non-radioactive fluorine-containing compound.

Optionally, during the reaction, the operator can introduce oxygen ($O_2$) into the reaction chamber 108 from the oxygen storage 105. The inventors have recognized that, in addition to the depth D of the mixture of reactants 105, a flow rate of the introduced oxygen can affect the reaction rate and/or the yield of the reaction. Thus, in certain embodiments, the operator can control the flow rate of the oxygen into the reaction chamber 108 based on a desired reaction yield by modulating the control valve 107. In other embodiments, the operator can also control the flow of the oxygen based on other parameters by utilizing an orifice plate, a venturi, and/or other suitable flow elements.

A product gas containing the carrier gas, the optionally introduced oxygen, and the gaseous non-radioactive fluorine-containing compound then flows to the product separator 106 from the reactor 104. The product separator 106 can then collect the non-radioactive fluorine-containing compound, for example, by condensing it as a condensate in the collector vessel 121. In other embodiments, multiple collector vessels (not shown) may be used to fractionate the product gas into multiple streams.

As shown in FIG. 2, the mixture of reactants 115 can have a depth D in the reaction vessel relative to the closed bottom 111 of the reaction vessel 110. The inventors have recognized that the depth D of the mixture of reactants 115 in the reaction vessel 110 can be controlled to affect a desired yield of the reaction between the reactants. In particular, it was unexpectedly discovered that by reducing the depth D of the mixture of reactants to have a specific range of values (e.g., about 0.25 inches), a surprisingly large improvement in efficiency may be obtained, as discussed in more detail below. As a result, the operator may control the depth D of the mixture of reactants 115 when loading the mixture into the reaction vessel 110 based on a desired reaction yield.

Experiments were conducted in a fluorine extraction system generally similar in configuration and function as the fluorine extraction system 100 of FIG. 1. A mixture of uranium tetrafluoride ($UF_4$) and germanium dioxide ($GeO_2$) was heated and reacted in the fluorine extraction system to about 1,600° F. with a purge gas containing helium (He) and oxygen ($O_2$). A gaseous reaction product was collected in a collector vessel, and the solid residue was observed in the reaction vessel. Analyzing the collected gaseous reaction product and the solid residue provided the following reaction yield data:

| Bed Depth | Efficiency | ΔEfficiency/ΔBed Depth |
|---|---|---|
| 0.25 in | 91.5% | 76.0% |
| 0.50 in | 72.5% | 11.2% |
| 0.75 in | 69.7% | −1.2% |
| 1.50 in | 70.6% | — |

In the foregoing table, efficiency is defined as the actual yield obtain from analysis divided by the theoretical yield, assuming 100% conversion. The parameter ΔEfficiency/ΔBed Depth is calculated as a percentage change per one inch of bed depth change.

As shown in the foregoing table, the efficiency change per bed depth remained relatively unchanged from 1.50 inches to about 0.50 inches. However, reducing the bed depth from 0.50 inches to 0.25 inches, the efficiency change per bed depth (as represented by ΔEfficiency/ΔBed Depth) improved by about 6.8 times. Without being bound by theory, such a surprising efficiency improvement is believed to be a result of the improved contact between the oxygen flowing across the opening 113 of the reaction vessel 110 and the mixture of reactants 115 in the reaction vessel 110. It is believed that the small depth D of the mixture of reactants 115 may enable the oxygen to penetrate deeper into the mixture of reactants 115 in the reaction vessel 110, and as a result, improve reaction efficiency between the uranium oxide and the oxidizing agent.

From the foregoing, it will be appreciated that specific embodiments of the disclosure have been described herein for purposes of illustration, but that various modifications may be made without deviating from the disclosure. For example, many of the elements of one embodiment may be combined with other embodiments in addition to or in lieu of the elements of the other embodiments. Accordingly, the disclosure is not limited except as by the appended claims.

I claim:

1. A fluorine extraction process, comprising:
   loading a mixture containing a uranium fluoride ($U_xF_y$, where x and y are integers) and an oxidizing agent into a reaction vessel, the reaction vessel having a closed bottom section and an opening spaced apart from the bottom section;
   heating the mixture containing the uranium fluoride and the oxidizing agent in the reaction vessel;
   forming at least one uranium oxide and a non-radioactive gas product from the heated mixture; and
   controlling a depth of the mixture in the reaction vessel to achieve a desired reaction yield and/or a desired reaction rate of the non-radioactive gas product.

2. The fluorine extraction process of claim 1, further comprising flowing a gas containing oxygen ($O_2$) across the opening of the reaction vessel loaded with the mixture, wherein
   loading the mixture containing the uranium fluoride and the oxidizing agent includes loading a mixture containing uranium tetrafluoride ($UF_4$) and germanium dioxide ($GeO_2$) into a reaction vessel having a generally semicircular cross section;
   heating the mixture includes heating the mixture containing uranium tetrafluoride ($UF_4$) and germanium dioxide ($GeO_2$) in the reaction vessel while flowing the gas containing oxygen ($O_2$) across the opening of the reaction vessel to react uranium tetrafluoride with germanium dioxide as follows:

$$3UF_4 + 3GeO_2 + O_2 \rightarrow U_3O_8 + 3GeF_4$$

controlling the depth of the mixture in the reaction vessel includes controlling the depth of the mixture in the reaction vessel and a flow rate of the gas containing oxygen ($O_2$) to achieve a reaction yield of at least 90%, the depth being no more than about 0.25 inches from the bottom of the generally semicircular cross section of the reaction vessel.

3. The fluorine extraction process of claim 1, further comprising flowing a gas containing oxygen ($O_2$) across the opening of the reaction vessel loaded with the mixture.

4. The fluorine extraction process of claim 1, further comprising flowing a gas containing oxygen ($O_2$) across a surface of the mixture in the reaction vessel in a direction generally parallel to the surface of the mixture.

5. The fluorine extraction process of claim 1 further comprising:
   flowing a gas containing oxygen ($O_2$) across a surface of the mixture in the reaction vessel; and
   wherein controlling the depth of the mixture includes controlling the depth of the mixture in the reaction vessel and a flow rate of the gas containing oxygen ($O_2$) to achieve the desired reaction yield and/or the desired reaction rate of the non-radioactive gas product.

6. The fluorine extraction process of claim 1 wherein controlling the depth of the mixture includes controlling the depth of the mixture to achieve the desired reaction yield of at least 90% germanium tetrafluoride in the non-radioactive gas product.

7. The fluorine extraction process of claim 1 wherein controlling the depth of the mixture includes controlling the depth of the mixture to achieve the desired reaction yield of at least 90% germanium tetrafluoride in the non-radioactive gas product, the depth being less than or equal to about 0.25 inches from the bottom of a generally semicircular cross section of the reaction vessel.

8. A process for extracting fluorine from a uranium fluoride, comprising:
   loading a mixture containing uranium tetrafluoride ($UF_4$) and a fluorine extraction agent into a reaction vessel, the fluorine extraction agent containing at least one of germanium oxide (GeO), germanium dioxide ($GeO_2$), silicon (Si), boron trioxide ($B_2O_3$), and silicon dioxide ($SiO_2$);
   extracting fluorine from the uranium tetrafluoride ($UF_4$) in the mixture with the fluorine extraction agent to produce a gas product from the heated mixture, the gas product not containing a compound of uranium; and
   selecting a depth of the mixture in the reaction vessel based on a desired reaction yield and/or a desired reaction rate of the gas product.

9. The fluorine extraction process of claim 8, further comprising flowing a gas containing oxygen ($O_2$) across an exposed surface of the mixture loaded in the reaction vessel.

10. The fluorine extraction process of claim 8, further comprising flowing a gas containing oxygen ($O_2$) across an exposed surface of the mixture loaded in the reaction vessel in a direction generally parallel to the exposed surface of the mixture.

11. The fluorine extraction process of claim 8, further comprising:
    flowing a gas containing oxygen ($O_2$) across an exposed surface of the mixture loaded in the reaction vessel; and
    controlling a flow rate of the gas containing oxygen ($O_2$) to achieve the desired reaction yield of the gas product.

12. The fluorine extraction process of claim 8 wherein selecting the depth of the mixture includes selecting the depth of the mixture to be less than or equal to about 0.25 inches from a bottom of a generally semicircular cross section of the reaction vessel.

13. The fluorine extraction process of claim 8, further comprising penetrating a depth of the mixture in the reaction vessel with the gas containing oxygen ($O_2$).

14. The fluorine extraction process of claim 8 wherein flowing the gas containing oxygen ($O_2$) includes flowing the gas containing oxygen ($O_2$) across the exposed surface of the mixture loaded in the reaction vessel in a direction generally parallel to the exposed surface of the mixture.

15. The fluorine extraction process of claim 8 wherein heating the mixture to produce the gas product includes converting the uranium tetrafluoride ($UF_4$) into at least one uranium dioxide.

16. A process for extracting fluorine from a uranium fluoride, comprising:

loading a mixture containing at least one of uranium tetrafluoride ($UF_4$) and uranium tetrafluoride ($UF_4$) and a fluorine extraction agent into a reaction vessel, the fluorine extraction agent containing at least one of germanium oxide (GeO), germanium dioxide ($GeO_2$), silicon (Si), boron trioxide ($B_2O_3$), and silicon dioxide ($SiO_2$);

flowing a gas containing oxygen ($O_2$) across an exposed surface of the mixture loaded in the reaction vessel;

heating the mixture to produce a gas product while flowing the gas containing oxygen ($O_2$) across the exposed surface of the mixture, the gas product not containing a compound of uranium; and controlling a flow rate of the gas containing oxygen ($O_2$) to achieve a desired reaction yield and/or a desired reaction rate of the gas product.

\* \* \* \* \*